Jan. 13, 1925.
R. WIRTJES
TRAP
Filed Oct. 14, 1924
1,523,375
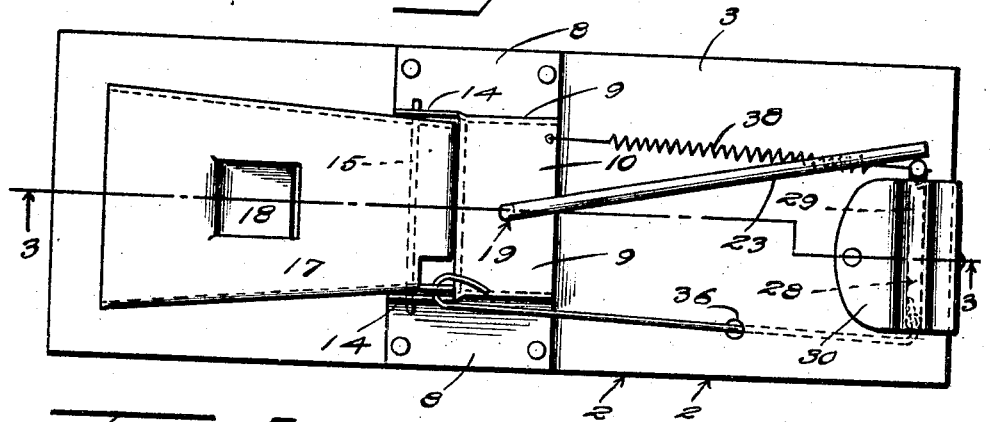
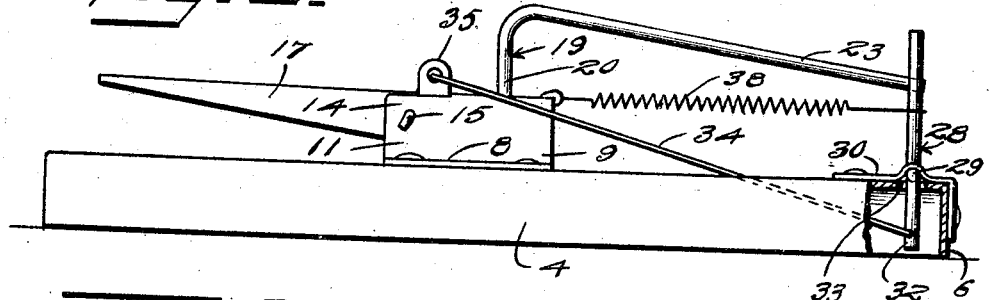
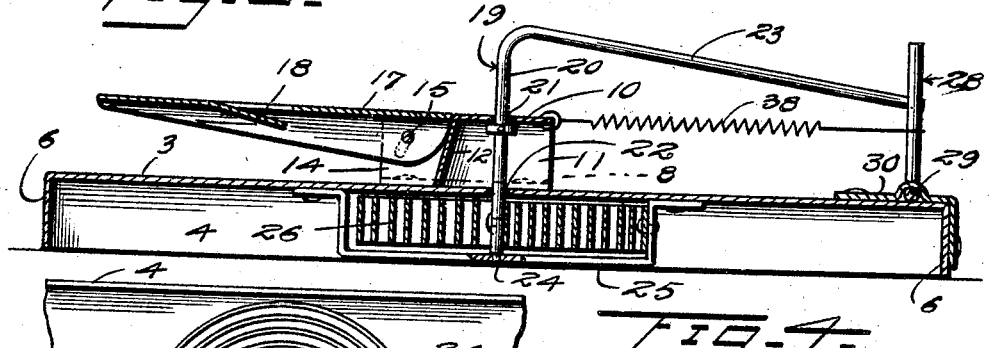
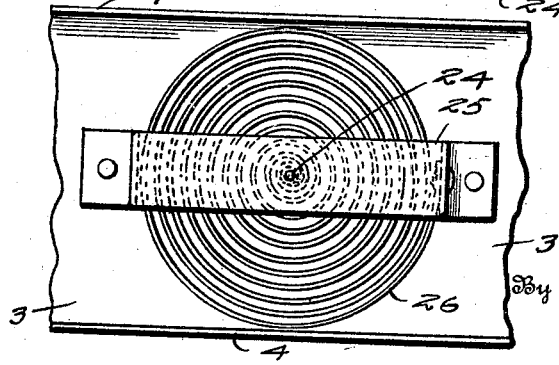
Inventor
Ralph Wirtjes
By Jacobi & Jacobi
Attorneys Patented Jan. 13, 1925.

1,523,375

UNITED STATES PATENT OFFICE.

RALPH WIRTJES, OF SHANNON, ILLINOIS.

TRAP.

Application filed October 14, 1924. Serial No. 743,620.

*To all whom it may concern:*

Be it known that RALPH WIRTJES, a citizen of the United States, residing at Shannon, in the county of Carroll and State of Illinois, has invented certain new and useful Improvements in Traps, of which the following is a specification.

This invention relates to traps for killing rats, gophers and other small animals and is of that type including an arm which is released by the animal attempting to obtain the bait, and which arm is adapted to be forcibly swung, striking the animal and killing or maiming it.

An object of the invention is the provision of a trap wherein a spring actuated striker arm, after release by the animal is automatically set for another operation.

With these and other objects in view, my invention consists in the novel features of construction, combination and arrangement of parts as will be hereinafter referred to and more particularly pointed out in the specification and claim.

Referring to the drawing wherein for the purpose of illustration is shown the preferred embodiment of my invention,—

Figure 1 is a top plan view of the trap;

Figure 2 is a side elevation thereof;

Figure 3 is a sectional view on line 3—3 of Fig. 1; and

Figure 4 is a bottom plan view with the ends broken away.

Referring now more particularly to the drawing by numerals of reference, 2 designates a hollow elongated and preferably metallic base including a top wall 3, side walls 4 and end walls 6. Supported transversely on the top wall 3 about midway its length, and suitably secured by bolted or riveted flanges 8 is a bridge member 9, the upper wall 10 of which is slit for a portion of its length adjacent its junction with the vertical side walls 11, and then turned downwardly as at 12 for the purpose of providing bearing supports 14 for the pivot pin 15, upon which latter is pivoted the platform 17 having a bait holder 18.

Rotatably mounted within the bridge 9, is a striker rod 19, comprising a horizontal portion 23, a vertical post 20 which passes through an aperture 21 in said bridge, a registering aperture 22 in the top wall of the base and has its lower end stepped in a bearing aperture 24 arranged centrally of a strap 25 riveted to the under face of said top wall.

The post 20, beneath the top wall 3, is secured to the inner end of a strong flat coiled spring 26, similar to a clock spring, said spring having its outer end secured to a portion of the strap 25, and by which strap, the spring is housed or confined. Obviously, rotation of the striker rod 19, in one direction winds the spring, the free end of the horizontal portion 23 cooperating with a trigger release mechanism to be presently described for normally retaining the striker against movement by the spring 26.

The trigger release mechanism comprises a trigger 28 having a horizontal portion 29 journaled in a strap 30 transversely and at one end of the top wall of the base, and a lever arm 32 extending downwardly through an elongated opening 33 in said top wall. For the purpose of rocking the trigger 28 and thus releasing the striker rod 19, the end of the lever arm is connected by a rod 34 with an ear 35 formed on the inner end of the pivoted platform, said rod 34 passing through an opening 36 in said top wall 3 of the base.

The platform is maintained in elevated position, and the trigger thus disposed in the path of movement of the rotatable striker rod 19, through the medium of a coil tension spring 38 connected at its ends respectively, with the bridge member 9 and with the trigger 28.

Briefly described, the operation is as follows:—

The striker rod 19 is rotated on the axis of the post 20, in such a direction as will place the flat coil spring 26 under tension, and during this operation, the trigger is moved out of the path of the free end of the arm 23, through depression of the platform 17.

When sufficient tension has been placed upon the flat spring 26, the platform properly baited is permitted to rise through tension of the coil spring 38 and the trigger moves into the path of movement of the striker arm 23 and holds it against rotation. An animal such as a rat or gopher, attempting to release the bait, causes the depression of the platform and the movement of the trigger in a direction to release the striker arm which, through the action of the flat spring 26 forcibly swings across the platform and striking the animal kills or maims it. The animal being knocked off the platform, it rises and the trigger again moves into the path of the striker rod by action of the coil spring 38. The movement of said striker arm is thereby arrested and the trap is set for the next animal and will thereafter be automatically set so long as the flat spring 26 is under tension.

From the foregoing description of the construction of my improved device, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:

In a trap, a hollow base, a bridge member supported transversely of said base intermediate its ends, a rotatable striker arm having a vertical post journaled in said bridge and base, and having a horizontal striking portion adapted to swing over and in the plane of the base, a flat coil spring arranged beneath the base and having its inner end connected with the post and its outer end with the base, a trigger pivoted on one end of the base having an oppositely directed lever arm extending below said base, a tension spring connecting said trigger and said bridge member, a bait carrying platform pivoted to said bridge member and a rod extending through said base and connecting the platform with the lower portion of said lever arm.

In testimony whereof I affix my signature.

RALPH WIRTJES